Figure 6:
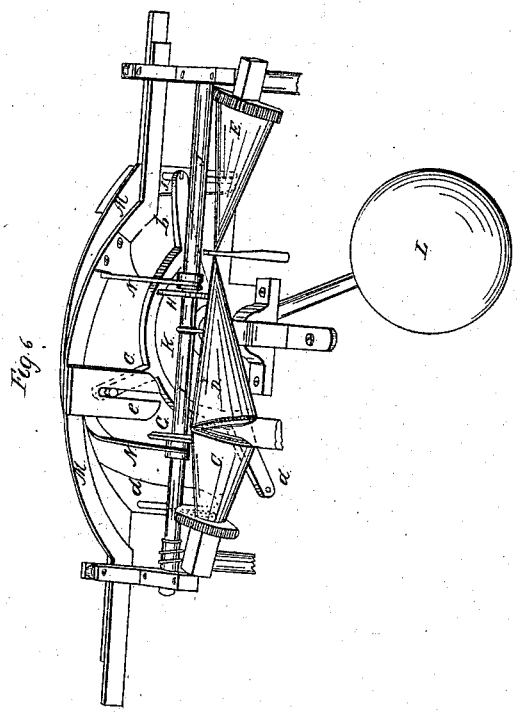

3 Sheets—Sheet 1.
S. ADAMS & G. R. CLARKE.
GRADE DELINEATOR.
No. 16,902.             Patented Mar. 31, 1857.
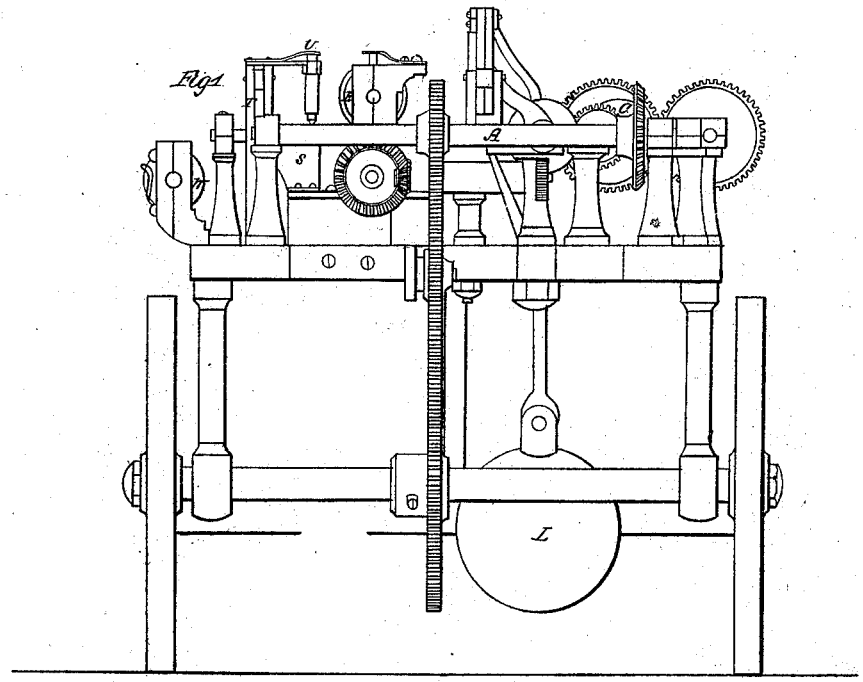
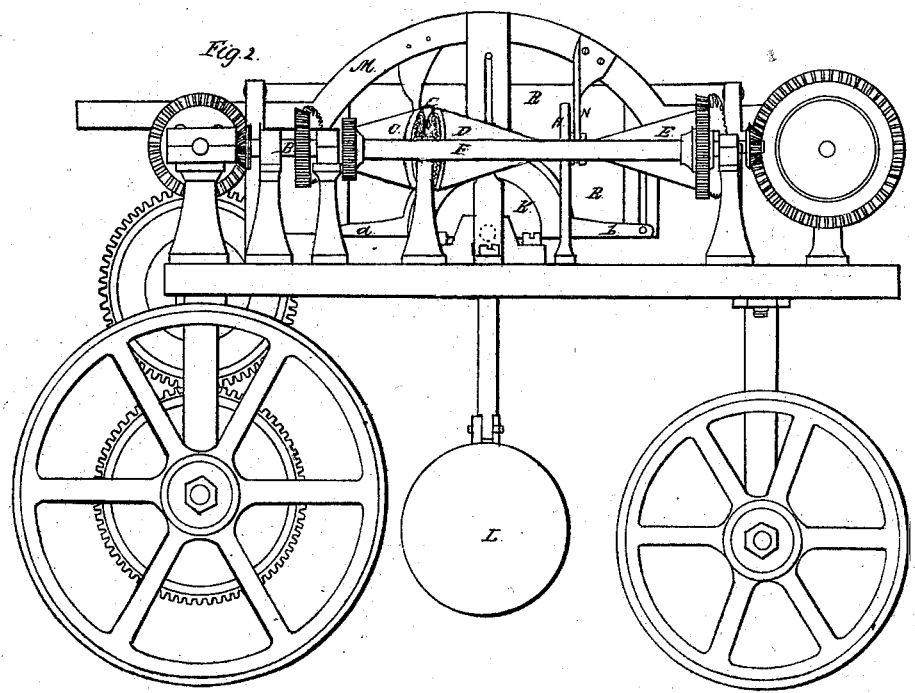

S. ADAMS & G. R. CLARKE.
GRADE DELINEATOR.
No. 16,902. Patented Mar. 31, 1857.
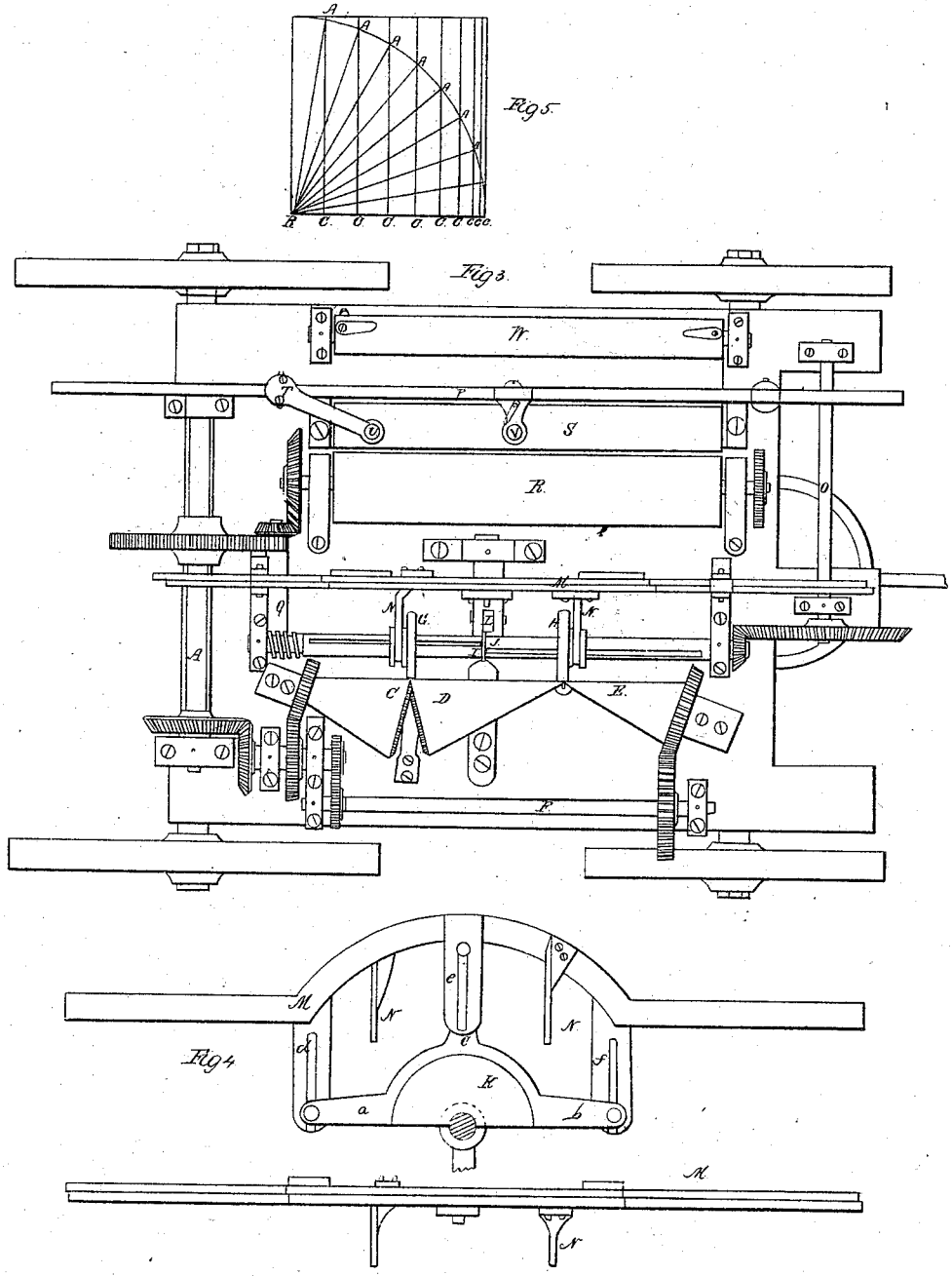

S. ADAMS & G. R. CLARKE.
GRADE DELINEATOR.

No. 16,902. Patented Mar. 31, 1857.

UNITED STATES PATENT OFFICE.

GEO. R. CLARKE AND SAML. ADAMS, OF ANTIOCH, CALIFORNIA.

GRADE-DELINEATOR.

Specification of Letters Patent No. 16,902, dated March 31, 1857.

*To all whom it may concern:*

Be it known that we, Geo. R. Clarke and Saml. Adams, of Antioch, California, have invented a new and useful Machine for Describing Grades; and we hereby declare that the following is a full and exact description thereof.

It is called the grade delineator and its nature consists in giving to the paper and the grade pen a graduated motion by means of cones pressing against friction wheels whose position upon the cones is regulated by means of a pendulum.

To enable others to make and use our invention we proceed to describe its construction and operation, reference being had to the drawings hereunto annexed and making a part of this specification. Figure 1, elevation of the side of the machine which is placed toward the rear of the wagon upon which the machine rests, the gear from the axle connecting from the shaft A; Fig. 2, elevation of the side of the machine at which the cones are placed; Fig. 3, plan or bird's eye view. Fig. 4, diagram representing the slides M, &c., Fig. 5, diagram to illustrate the motion of the slides M. Fig. 6, perspective showing the motions of the machinery which moves the friction wheels G and H upon the cones C and D when the machine is on a down grade.

The purpose of this machine is to describe the grade of that part of the country to be surveyed by driving over it with a wagon the hind axle of which is connected with the driving shaft, A. Upon the end of this shaft is a bevel wheel driving a pinion upon a short shaft, B, which drives by two connecting cog wheels, one of the paper cones, C, and this paper cone abuts to and drives by a gear the other cone, D, which is for moving the pen in the down grade and also for driving the paper rollers. Connected with the short shaft, B, is the long shaft, F, which drives by a cog wheel at its end the up hill cone, E.

There are two friction wheels, G and H, against which the cones are pressed, which wheels receive from the cones the graduation motion. They slide upon two separate shafts, I and J, connected at the middle by the end of one extending into a tube bored into the other. The forward and back motion of these wheels is produced by three arms which project from the shaft of the pendulum, L.

In the ends of the arms, *a*, *b* and *c*, is a small steel pin that works in slots cut in the bars, *d*, *e* and *f*, of the slides, M. To these slides the friction wheels are attached by pieces, N.

The pendulum hangs upon a shaft and is below the friction wheels. Upon the shaft of the pendulum is the semiwheel K and three arms, *a*, *b*, *c*. Upon the shaft, J, of one of the friction wheels is a bevel gear driving a shaft, O, which by means of a screw and wheel or pinion, gives motion to the grade pen, V. Instead of a rack as here shown a screw may be used to give motion to the pen, and instead of a small wheel acting directly upon the pen rack, P, as here shown, and adapted for a large scale, we use a screw and wheel when the drawing is to be made to a small scale. Upon the shaft, I, of the other friction wheel is a screw which operates a pinion upon a shaft Q driving the rollers, R, between which the paper passes. These rollers are geared together and are of the length required for the width of the paper upon which the grade is to described.

Near to the rollers is the paper rest, S, over which the paper passes while being marked. Upon the stand, T, through which passes the pen rack, P, is a stationary pen, U, for marking the base line as the paper passes under it. The grade pen, V, is attached to the pen rack and is moved so that as the paper passes along the pen vibrates back and forth across the paper according to the grade.

At the extreme outside of the machine is the roller, W, upon which the paper is wound, ready to be used. The cones are intended to graduate the motion given to the pen and to the paper. At the extreme point they convey to the friction wheels the minimum motion or none at all. At the base of the cones they convey to the friction wheels G and H the maximum speed. When the wagon bearing the machine is running upon a level the friction wheel H which drives the grade pen V is off the points of the cones E and D and receives no motion from either of them; therefore the pen makes a line parallel with the base line, at the same time the other friction wheel G which moves the paper is at the base of the cones C and D and moves at its maximum speed; the paper is therefore moved along at the full rate according to the scale of the wagon's motion.

As the machine is drawn up hill the pendulum continuing to hang perpendicularly, slides the two friction wheels, one of them H going, upon the up hill cone E toward its base and the other G moving from the base of the paper cone D toward its point. If the acclivity is at an angle of 45° the two friction wheels are at a point on the cones where the motion will be equal and will cause the pen and paper to move at the same speed (if the scale for the perpendicular were the same as the horizontal) describing the proper grade. On ascending a perpendicular the friction wheel G which drives the paper would be off the point of the cone D and standing still; the paper consequently would not move, while the other wheel H (driving the pen) would be at the base of the cone E (if it were an entire cone) and cause the pen to mark a perpendicular line. The cones C and E need not be made the full length as it would never be required to mark so steep a grade. If the wagon goes down hill all these motions would be reversed. The pendulum swinging forward moves the friction wheels in the other direction so that the pen would describe the down grade being driven by the middle cone as will be more readily perceived reference being had to Fig. 6 of the drawings. The pendulum L swinging forward moves the semiwheel K. The pin in the arm $a$ having the slot in the bar $d$ and swinging to the position shown in the figure and the pin in the arm $b$ moving up along the slot in the bar $f$ produces a horizontal motion in the slide M and moves the friction wheel G from the base of the cones C D to the position as shown; while the pin in the arm C having a corresponding motion with the other two arms moves the slide to which is attached the friction wheel H and gives to it, a horizontal motion from the points of the cones D, E, to the position shown in the drawing.

The kind of motion given to the slides M by the action of the arms $a, b, c$, which are a part of the pendulum above its axis, is that which is produced horizontally by a point on the periphery of a revolving wheel or circle. The perpendicular slot in the bars $d, e, f$, allowing said point say at the vertex to slide perpendicularly to the horizon through an arc of 90°, thus producing a motion decreasing in a certain ratio until the arm $c$, has described the whole of said arc, while the arm $a$ moving from the horizon to the vertex will increase in motion in like ratio. Said motion is found in diagram (Fig. 5). B, C, and $c$, show the distance made on the horizon by the slides M, while the radiating lines B, A, show the degrees through which the pendulum has swung. It will be perceived that the motion thus imparted to the friction wheels by the arms $a, b, c$, working in the slots of the bars $d, e, f$, of the slides M is an unequal one the friction wheel H moving along the cone E perhaps $\frac{3}{4}$ of an inch while the wheel G moves along the cone D $\frac{1}{4}$ of an inch. It will be further perceived that if this motion be continued along the cones by the pendulum swinging past 45° degrees the two motions will be reversed, the friction wheel G moving farthest along the cone D while the wheel H will move the least upon cone E, in every case the motion being exactly what is required to give the true grade.

What we claim and desire to secure by Letters Patent is—

1. The use of the pendulum L or its equivalent operated upon by the gravitation in combination with the cones C, D, E, and the friction wheels G and H or their equivalent.

2. We also claim in combination with the pendulum L and the cones C, D, E the arrangement of the arms $a, b, c$, the bars $d, e, f$, and the slides M, to move the friction rollers along the cones substantially as above described.

3. We claim combining the pendulum L or its equivalent with the paper rolls and grade pen or either of them in such a manner that their respective motions as herein set forth may produce correct horizontal and vertical scales or a profile of the ground traveled over by the carriage.

GEO. R. CLARKE.
SAML. ADAMS.

Witnesses:
CHAS. G. KELLOGG,
O. G. WARREN.